Figure 1:
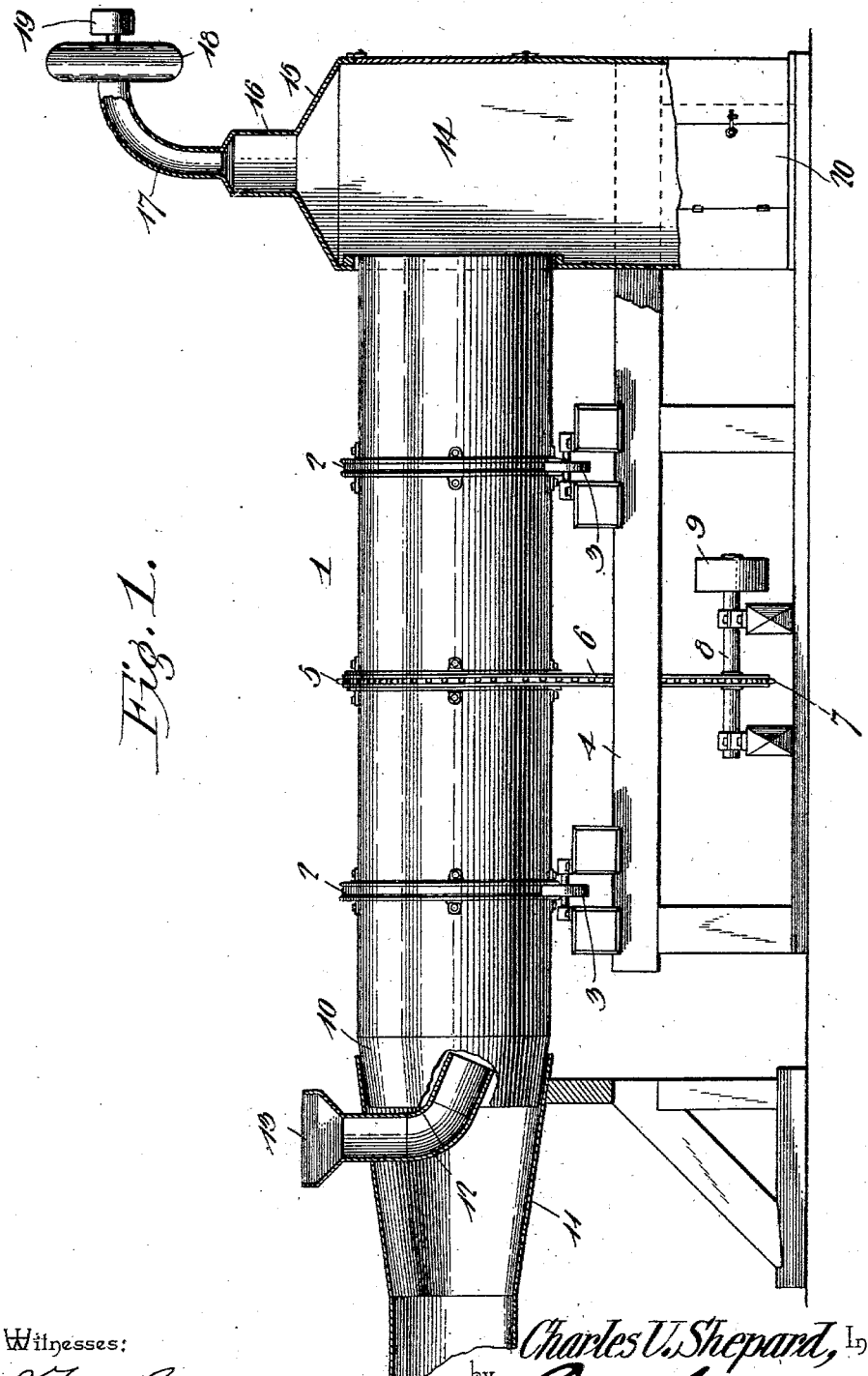

No. 694,795. Patented Mar. 4, 1902.
C. U. SHEPARD.
METHOD OF WITHERING TEA LEAVES.
(Application filed July 31, 1901.)
(No Model.) 2 Sheets—Sheet 1.

No. 694,795. Patented Mar. 4, 1902.
C. U. SHEPARD.
METHOD OF WITHERING TEA LEAVES.
(Application filed July 31, 1901.)
(No Model.) 2 Sheets—Sheet 2.

Witnesses: Charles U. Shepard, Inventor:
by C. A. Snow & Co.
Attorneys.

UNITED STATES PATENT OFFICE.

CHARLES U. SHEPARD, OF SUMMERVILLE, SOUTH CAROLINA.

METHOD OF WITHERING TEA-LEAVES.

SPECIFICATION forming part of Letters Patent No. 694,795, dated March 4, 1902.

Application filed July 31, 1901. Serial No. 70,435. (No specimens.)

*To all whom it may concern:*

Be it known that I, CHARLES U. SHEPARD, a citizen of the United States, residing at Summerville, in the county of Dorchester and State of South Carolina, have invented a new and useful Method of Withering Tea-Leaves, of which the following is a specification.

This invention relates to a method of treating green or freshly-picked tea-leaves under the procedure of which those enzyms that are productive of destructive oxidation are sterilized or destroyed, those favorable to the flavoring-oil of the tea are conserved, and withering of the leaves is effected in a manner best to adapt them for subsequent rolling.

As is well known, green tea-leaves contain different kinds of enzyms, certain of which are favorable to the flavoring-oil of the tea and have to be retained in order that the finished product shall possess a high and delicate flavor, while others, known in the art as "oxidizers" and which if retained in the leaf will result in destructive fermentation thereof, have to be destroyed or rendered sterile in order that after the tea is a finished product they will not cause deterioration thereof. Further, and as is also well known, the withering of tea-leaves is a step preliminary to rolling the fresh leaf, and proper rolling is an indispensable concomitant in the thorough curing of the tea and depends for its success upon the degree of perfection of the withering. Heretofore withering has been accomplished in several different ways, all of which are primitive in character and require the expenditure of much time and labor in their consummation. Among the different procedures employed may be mentioned those of exposing the leaves in thin layers to the action of atmospheric air, as by spreading them upon floors, shelves, and the like, the steaming of the leaves over kettles of boiling water or in steam-chests, the roasting of the leaves in pans arranged over a slow fire, and, in addition to either of the steps named and in conjunction with any one of them, the throwing of the leaves into the air several hundred times to bring them into the desired condition for rolling. The desideratum of each of the above-named procedures is to bring the elastic and more or less firm fresh leaves to a flaccid state, in which they resemble in feel an old kid glove, and this condition is best attained where the leaves are thrown upward into the air, effecting thereby a thorough separation leaf by leaf and by the slight jar or impact in falling rendering them best adapted for subsequent rolling and twisting.

The object, therefore, of the present invention is in a simple, thoroughly feasible, and rapid manner to effect sterilization or destruction of oxidizing-enzyms, conservation of those enzyms favorable to the flavoring-oil of the tea, and the proper withering of the leaves, as will be hereinafter fully described, and particularly pointed out in the claims.

In the accompanying drawings, forming a part of this specification, and in which like numerals of reference indicate corresponding parts, there is illustrated a form of apparatus capable of carrying the method into effect, it being understood that the invention is not to be limited to any particular form of apparatus in effecting its consummation, and in these drawings—

Figure 2:
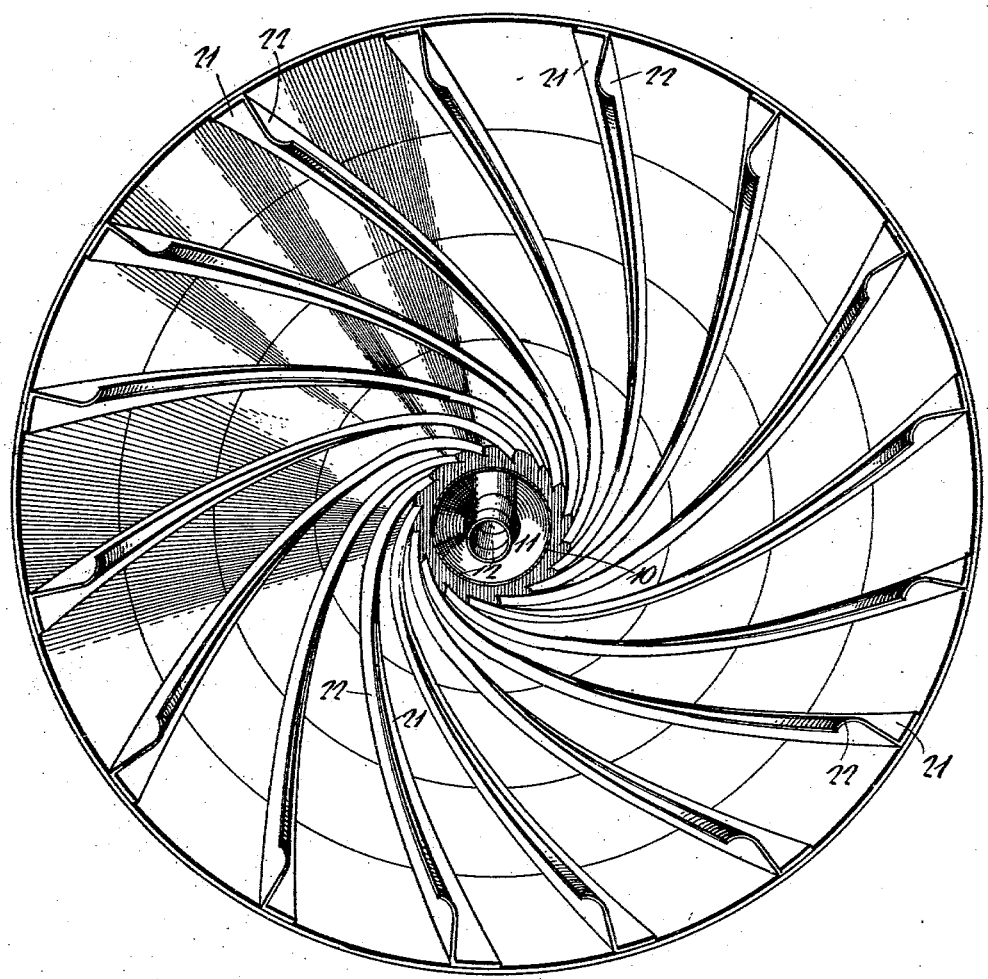

Figure 1 is a view in side elevation, partly in section, exhibiting a form of apparatus for carrying out the method. Fig. 2 is an end view of the withering-cylinder, showing more particularly the arrangement of the flights therein by which the leaves are picked up and dropped continuously throughout the length of the cylinder or drum.

Referring to the drawings, 1 designates the cylinder, which may be constructed of a single length of tubing or in separate lengths suitably assembled. The cylinder is provided near each end with a circumferential double-flanged track 2 to engage roller-bearings 3, supported upon a suitable framework 4. Intermediate of the ends of the length of the cylinder is arranged a toothed band 5 to be engaged by a sprocket-chain 6, the same passing around a sprocket-wheel 7, carried by a shaft 8, the shaft being provided with a band-wheel 9, which is to be connected with a suitable source of power through a belt not necessary to be shown. The front end of the cylinder is somewhat constricted, as at 10, and projects within a cone-shaped pipe or flue 11, through which air, either hot or cold, is supplied to the cylinder. The pipe 11 has associated with it a feed-chute 12, the upper end of which carries a hopper 13 and the lower end of which is curved and projected into the central portion of the constricted part of the cylinder, the angular disposition of the constricted portion, together with the angle of the discharge-spout of the chute, operating to prevent any loss of tea-leaves by passing out at the front of the cylinder. The rear end of the cylinder opens into a casing 14, the top of which is closed by a head 15, having a centrally-disposed tubular extention 16, with which connects a pipe 17, leading to the casing of an exhaust-fan 18, the fan being driven from a suitable source of power (not shown) through a pulley 19, the fan operating to set up a suction within the cylinder 1, and thereby draw therethrough air, either hot or cold, as may be required. The casing 14 is provided with a door 20, by which access may be had thereto for the purpose of removing the treated leaves.

Secured to the inner walls of the cylinder is a series of spirally-arranged flights the depending flanges of which are by preference curved, as at 22, to augment the capacity of the flights for picking up the leaves, the curved portions further operating to effect mechanical separation of the leaves. As herein shown, the flights are curved sufficiently to give a quarter-turn in the length of the cylinder; but it is to be understood that the degree of curvature may be varied to suit the requirements arising in the use of the apparatus.

In operation the green tea-leaves are fed into the hopper 13 and thence to the cylininder, where they are caught up by the flights and are rapidly and continuously dropped through the width of the diameter of the cylinder up to the discharge end thereof, the degree of rapidity of agitation and dropping being governed by the speed at which the cylinder is rotated, the operation being continuous—that is to say, the leaves are not retained in a prescribed zone, but are constantly moving onward to the discharge, so that there could be a continuous supply of fresh leaves to the hopper and a continuous discharge of withered leaves into the casing 14. In their passing through the cylinder the leaves are individually subjected to the combined action of air passing through the cylinder and to a slight pounding action resulting from their fall through the width of the cylinder and also by contact with each other in falling, so that by the time a leaf has passed through the cylinder it will be found to be perfectly withered and in best possible condition for rolling and twisting.

The destruction of the oxidizing-enzyms is effected by a highly-heated blast of air, which contacts with the freshly-entering leaves in its most highly heated condition and rapidly decreases in temperature to the discharge, the first contact of the heated air with the entering leaves causing sterilization or destruction of the said enzyms and the further contact under gradually-diminishing temperature with the falling leaves in their progressive onward movement to the discharge effecting proper withering without complete drying. By causing a rapid drop in the temperature of the air or withering medium destruction of those enzyms favorable to the flavoring-oil of the tea is obviated, so that the finished product will not have any of those elements requisite to a delicate and highly-flavored article in the least injured. There is therefore, as will be apparent, under this procedure, as practiced, first the destruction or sterilization of the oxidizing-enzyms, followed by the withering and working of the leaves to bring them mechanically to the condition best adapted for rolling and twisting, and the operations being continuous and very rapid effects an enormous saving in time and labor in the production of the finished product. It is of course well known that tea has heretofore been confined in a revolving cylinder provided with flights or shelves and subjected therein to the action of heated air or steam; but this is widely different from the present procedure, inasmuch as in the practiced art referred to there is no onward movement of the leaves toward a discharge under a rapidly-decreasing temperature, but, on the contrary, they are confined within the drum or cylinder until properly dried and withered, after which they are removed in bulk, necessitating a stoppage of the machinery. It will be readily seen that under such treatment were a degree of heat applied to the leaves to destroy the oxidizing-enzyms that destruction of those enzyms favorable to the flavoring-oil of the tea would inevitably follow, thereby defeating the very object of the present invention.

In order that the apparatus of this procedure may be adapted for treating leaves of different characters—as, for instance, black tea-leaves or green tea-leaves—this may be effected by adjusting the temperature and speed of the air-current, or by changing the speed of revolution per minute of the cylinder, or by altering the number, form, or spirality of the flights in the cylinder, thereby varying the movements of the tea-leaves.

It will be seen from the foregoing description that the tea-leaves are mechanically subjected to all the treatments heretofore manually conducted and that the result is obtained more rapidly and with a greater evenness of output of the product than could possibly result from the practiced modes heretofore in vogue, and, further, that the procedure may be carried out equally well in wet weather as in dry, thereby saving in time and preventing any deterioration in the leaves which might result if not subjected to treatment very shortly after having been removed from the plants.

Having thus fully described my invention, what I claim as new, and desire to secure by Letters Patent, is—

1. The herein-described method of withering tea-leaves, which consists in taking the fresh leaves, passing them through an inclosed space, and subjecting them therein to agitation with progressive onward movement, in the presence of a current of suitably-tempered air.

2. The herein-described method of withering tea-leaves, which consists in taking the fresh leaves, passing them through an inclosed space, picking up and dropping the leaves within the space and at the same time imparting progressive onward movement thereto in the presence of a current of suitably-tempered air.

3. The herein-described method of withering green tea and of destroying the oxidizing-enzyms thereof, which consists in passing the fresh leaves to an inclosed space, subjecting them at their point of entrance to a current of highly-heated air, and then picking up and dropping the leaves within the space while imparting progressive onward movement thereto toward the discharge.

4. The herein-described method of withering green tea, of destroying the oxidizing-enzyms thereof and conserving those favorable to the flavoring-oil of the tea, which consists in passing the fresh leaves to an inclosed space, subjecting them at their point of entrance to a current of highly-heated air, and then picking up and dropping the leaves within the space with decreasing temperature while imparting progressive onward movement thereto toward the discharge.

In testimony that I claim the foregoing as my own I have hereto affixed my signature in the presence of two witnesses.

CHARLES U. SHEPARD.

Witnesses:
ISAAC AULD,
THOMAS W. MCGILL, Jr.